US011067595B2

(12) United States Patent
Nie et al.

(10) Patent No.: US 11,067,595 B2
(45) Date of Patent: Jul. 20, 2021

(54) PIEZOELECTRIC ACCELERATION SENSOR

(71) Applicant: FATRI UNITED TESTING & CONTROL (QUANZHOU) TECHNOLOGIES CO., LTD., Fujian (CN)

(72) Inventors: Yongzhong Nie, Xiamen (CN); Ying Gao, Xiamen (CN)

(73) Assignee: FATRI UNITED TESTING & CONTROL (QUANZHOU) TECHNOLOGIES CO., LTD., Quanzhou (CN)

( * ) Notice: Subject to any disclaimer, the term of this patent is extended or adjusted under 35 U.S.C. 154(b) by 82 days.

(21) Appl. No.: 16/571,698

(22) Filed: Sep. 16, 2019

(65) Prior Publication Data
US 2020/0400711 A1 Dec. 24, 2020

(30) Foreign Application Priority Data

Jun. 21, 2019 (CN) .......................... 201920940810.3

(51) Int. Cl.
G01P 15/09 (2006.01)
(52) U.S. Cl.
CPC ................. G01P 15/0922 (2013.01)
(58) Field of Classification Search
CPC ............. G01P 15/0922; G01P 15/09
See application file for complete search history.

(56) References Cited

U.S. PATENT DOCUMENTS

| 4,399,705 | A | * | 8/1983 | Weiger | .................. | G01L 23/222 |
| | | | | | | 310/329 |
| 4,620,446 | A | * | 11/1986 | Jensen | .................... | G01H 11/08 |
| | | | | | | 73/652 |
| 2015/0063062 | A1 | * | 3/2015 | Fernihough | ......... | G01P 15/0922 |
| | | | | | | 367/15 |
| 2018/0372772 | A1 | * | 12/2018 | Rosa | ................... | G01P 15/0907 |

* cited by examiner

Primary Examiner — Xin Y Zhong
(74) Attorney, Agent, or Firm — Law Offices of Liaoteng Wang

(57) ABSTRACT

The disclosure provides a piezoelectric acceleration sensor including a charge output element, a casing, a cable assembly and a connector. The casing is snap-fitted to a supporting portion of a base of the charge output element, and forms a receiving space for receiving the charge output element, the piezoelectric, and the mass block with the supporting portion. The cable assembly is connected to the supporting portion. The connector is connected to an end of the cable assembly facing away from the supporting portion, and is insulated from the cable assembly. One end of either of a first lead and a second lead of the cable assembly is electrically connected to the piezoelectric element, while the other end of the first lead is electrically connected to a conductive terminal of the connector and the other end of the second lead is electrically connected to a housing of the connector.

13 Claims, 2 Drawing Sheets

PIEZOELECTRIC ACCELERATION SENSOR

CROSS-REFERENCE TO RELATED APPLICATION

This application is based on and claims priority to Chinese Patent Application No. 201920940810.3 filed on Jun. 21, 2019, which is incorporated herein by reference in its entirety.

TECHNICAL FIELD

The disclosure relates to the technical field of sensor, and in particular to a piezoelectric acceleration sensor.

BACKGROUND

A piezoelectric acceleration sensor, also known as a piezoelectric accelerometer, belongs to an inertial sensor. The piezoelectric acceleration sensor is a sensor in which the force applied to the piezoelectric element by the mass block will change when the accelerometer is vibrated by using the piezoelectric effect of the piezoelectric element. When the measured vibration frequency is much lower than the natural frequency of the accelerometer, the change in force is proportional to the measured acceleration.

The piezoelectric accelerometers are widely used in fault detection systems. The urgent problem to be solved is how to improve the transmission accuracy of electrical signal and ensure measurement accuracy.

SUMMARY

The embodiment of the disclosure provides a piezoelectric acceleration sensor, which is aimed to improve the measurement accuracy of the piezoelectric acceleration sensor.

A first embodiment of the disclosure provides a piezoelectric acceleration sensor including: a charge output element including a base, a piezoelectric element and a mass block, wherein the base includes a supporting portion and a connecting portion disposed on the supporting portion and extending in a first direction, the piezoelectric element and the mass block are arranged along the first direction and sleeved respectively on the connecting portion, and the piezoelectric element is disposed close to the supporting portion with respect to the mass block; a casing snap-fitted to the supporting portion, wherein the casing forms a receiving space together with the supporting portion, the connecting portion, the piezoelectric element and the mass block are disposed within the receiving space; a cable assembly connected to the supporting portion, wherein the cable assembly extends in a second direction, the cable assembly includes a cable body, the cable body includes a protective case and first and second leads penetrating the protective case, and one end of each of the first lead and the second lead passes through the supporting portion into the receiving space and is electrically connected to the piezoelectric element; and a connector connected to an end of the cable assembly facing away from the supporting portion and insulated from the cable assembly, wherein the connector includes an housing that is open at both ends, a first insulating layer disposed in the housing, and a conductive terminal penetrating the first insulating layer along a direction of the two openings of the housing, the other end of the first lead is electrically connected to the conductive terminal, and the other end of the second lead is electrically connected to the housing.

According to an aspect of the disclosure, an end of the conductive terminal close to the cable assembly is provided with a first through hole penetrating in a direction perpendicular to an axial direction of the conductive terminal, and the first lead is electrically connected to the conductive terminal through the first through hole.

According to an aspect of the disclosure, an end of the conductive terminal away from the cable assembly is provided with a first recess which is formed by recessing for a first predetermined length in an axial direction of the conductive terminal.

According to an aspect of the disclosure, a recess wall of the first recess is provided with two openings which are disposed oppositely and formed by recessing from a notch of the first recess toward an interior of the first recess.

According to an aspect of the disclosure, a side wall of the housing is provided with at least one second through hole penetrating the side wall, and the second lead wire is electrically connected to the housing through one of the second through holes.

According to an aspect of the disclosure, the first insulating layer includes a first glass layer and a ceramic layer which are sequentially disposed along an axial direction of the conductive terminal, and the glass layer is disposed close to the cable assembly with respect to the ceramic layer.

According to an aspect of the disclosure, the cable assembly further includes a first sleeve, one end of the first sleeve is connected to an end of the cable body away from the supporting portion while the other end of the first sleeve is connected to the connector through a second insulating layer, the housing partially extends into the first sleeve, and the second insulating layer is sleeved on an outer peripheral surface of the connector.

According to an aspect of the disclosure, a convex portion is provided on an outer peripheral surface between two axial ends of the housing, the convex portion is provided with a locking wire hole, and the second insulating layer is a second glass layer.

According to an aspect of the disclosure, the connector is disposed coaxially with the first sleeve, and an extending direction of the cable assembly is opposite to and parallel to an extending direction of the connecting portion.

According to an aspect of the disclosure, the cable assembly further includes a second sleeve, and the cable body is connected to the casing by the second sleeve.

According to an aspect of the disclosure, the supporting portion is provided with a mounting hole penetrating the supporting portion in a direction perpendicular to an axial direction of the connecting portion.

According to an aspect of the disclosure, the casing includes a surface parallel to an axial direction of the connecting portion, an extension portion is formed by extending the surface in a direction away from the supporting portion, a mounting portion is provided on the extension portion, and the mounting portion is a recess structure formed by recessing an edge of the extension portion toward an interior of the extension portion.

In the embodiment of the disclosure, since one of the two electrodes of the piezoelectric element is connected to the conductive terminal of the connector, the output of the electrical signal of the charge output element is achieved. Further, since the other of the two electrodes of the piezoelectric element is connected to the housing of the connector and the housing of the connector is insulated from the casing of the piezoelectric acceleration sensor, the grounding of the charge output element is realized by the housing of the connector. Therefore, it is possible to ensure isolation between the output of signal from the piezoelectric acceleration sensor and the casing of the piezoelectric acceleration sensor when the piezoelectric acceleration sensor according to the embodiment is applied to the object to be measured, thereby avoiding the influence of the casing on the output signal of the charge output element, ensuring the measurement accuracy of the piezoelectric acceleration sensor, and effectively solving the problem that the piezoelectric acceleration sensor of the single-core output is susceptible to external noise.

BRIEF DESCRIPTION OF THE DRAWINGS

In order to more clearly illustrate the technical solution according to the embodiments of the disclosure, the drawings used in the embodiments of the disclosure will be briefly described below. It is apparent that the drawings described below are only some implementations of the disclosure, and other drawings may be obtained by those of ordinary skill in the art without any inventive labor.

Figure 1:
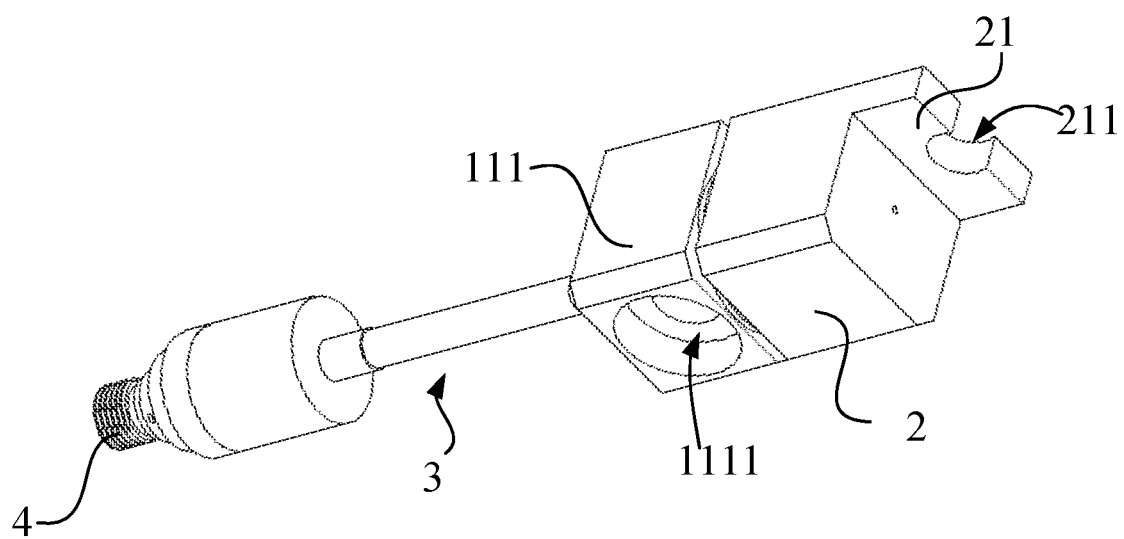
FIG. 1 is a schematic structural view of a piezoelectric acceleration sensor according to an embodiment of the disclosure.

Description of Reference Signs:

| 1 | charge output element; | 11 | base; |
|---|---|---|---|
| 111 | supporting portion; | 1111 | mounting hole; |
| 112 | connecting portion; | 12 | piezoelectric element; |
| 13 | mass block; | 14 | fastening member; |
| 2 | casing; | 21 | extension portion; |
| 211 | mounting portion; | 3 | cable assembly; |
| 31 | cable body; | 32 | first sleeve; |
| 33 | second sleeve; | 4 | connector; |
| 41 | housing; | 411 | second through hole; |
| 412 | convex portion; | 4121 | locking hole; |
| 42 | first insulating layer; | 421 | first glass layer; |
| 422 | ceramic layer; | 43 | conductive terminal; |
| 431 | first through hole; | 432 | first recess; |
| 433 | opening; | 5 | second insulating layer. |

DETAILED DESCRIPTION

Features and exemplary embodiments of various aspects of the disclosure are described in detail below. In the following detailed description, numerous specific details are set forth to provide comprehensive understanding of the disclosure. However, it will be apparent to those skilled in the art that the disclosure may be practiced without some of the specific details. The following description of the embodiments is merely to provide a better understanding of the disclosure by illustrating the examples of the disclosure. In the drawings and the following description, at least some of the known structures and techniques are not shown, to avoid unnecessarily obscuring the disclosure. Further, for clarity, the dimension of some of the structures may be enlarged. Furthermore, features, structures, or characteristics described hereinafter may be combined in any suitable manner in one or more embodiments.

The orientation terms appearing in the following description refer to the directions shown in the drawings, and are not intended to limit the specific structure of the embodiments of the disclosure. In the description of the disclosure, it should also be noted that, unless otherwise explicitly stated and defined, the terms "mount" or "connect" shall be understood broadly, for example, they may be fixed connection or detachable connection or integral connection; alternatively, they may be direct connection or indirect connection. The specific meaning of the above terms in the disclosure may be understood by those skilled in the art based on the specific situation.

For a better understanding of the disclosure, a piezoelectric acceleration sensor according to an embodiment of the disclosure will be described in detail below with reference to FIGS. 1 to 5.

Figure 2:
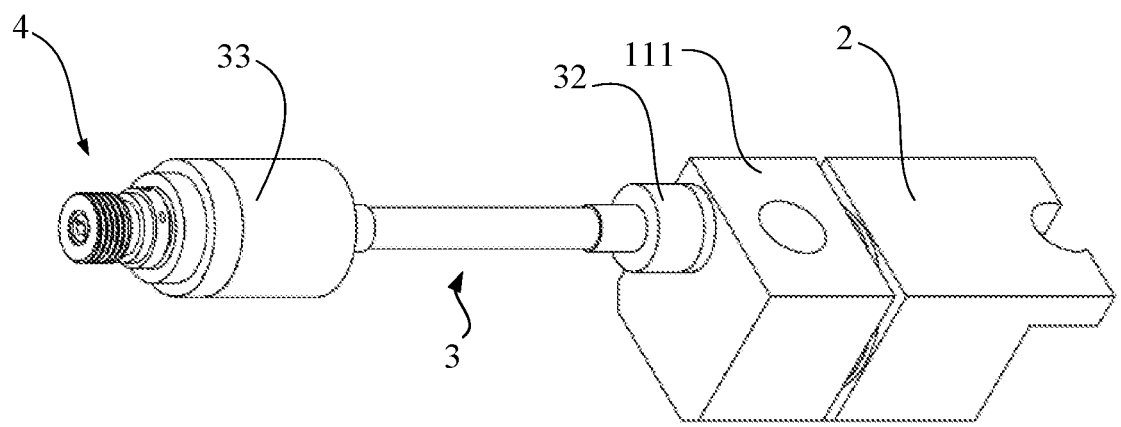
FIG. 2 is a schematic structural view of another perspective view of a piezoelectric acceleration sensor according to an embodiment of the disclosure.
Figure 3:
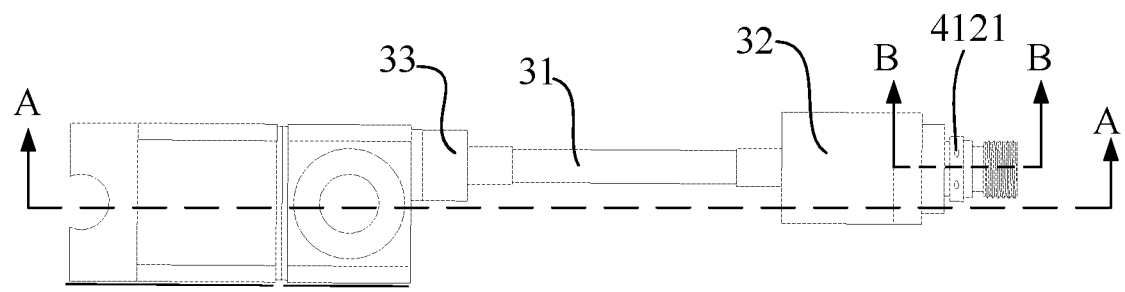
FIG. 3 is a top plan view of a piezoelectric acceleration sensor according to an embodiment of the disclosure.
Figure 4:
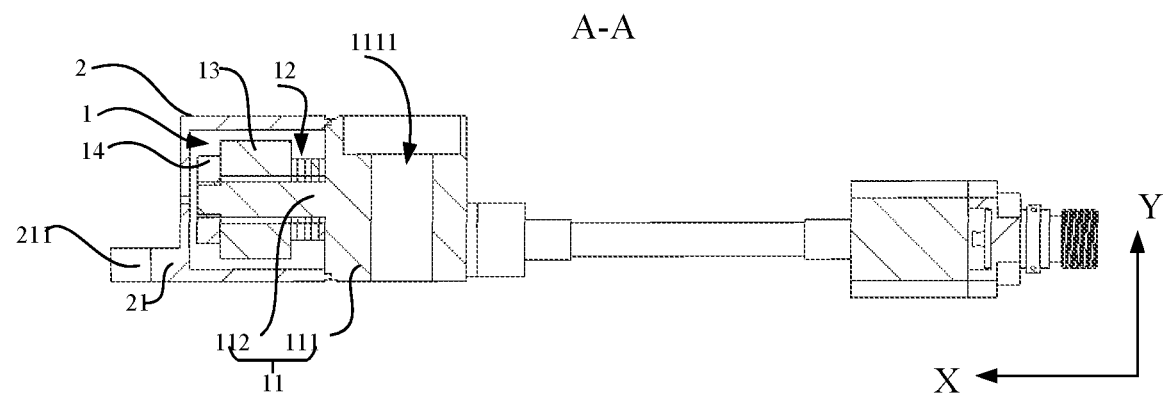
FIG. 4 is a cross-sectional view taken along line A-A of FIG. 3.
Figure 5:
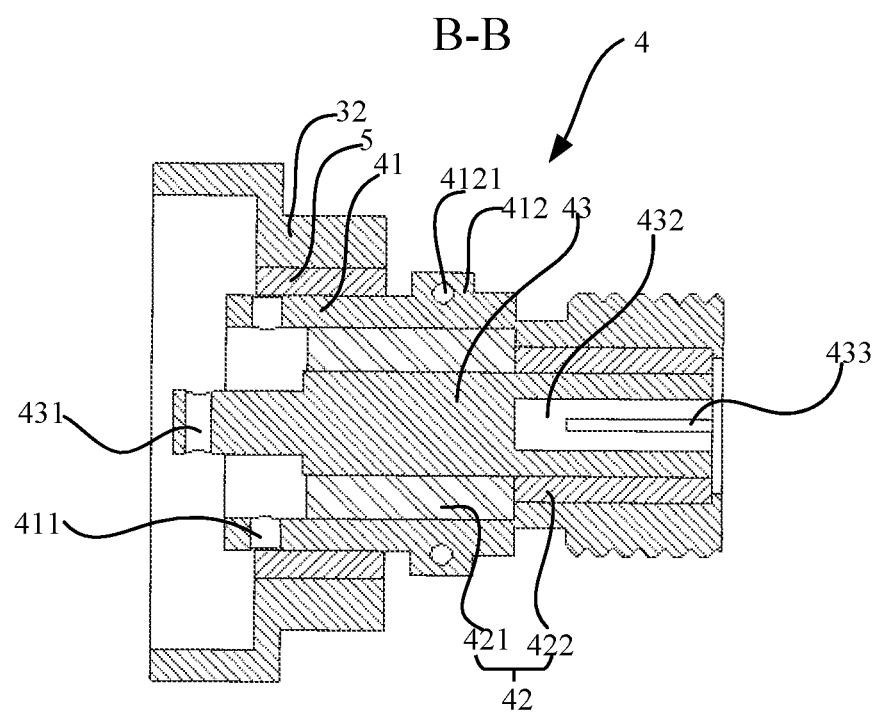
FIG. 5 is a cross-sectional view taken along line B-B of FIG. 3.

FIG. 1 is a schematic structural view of a piezoelectric acceleration sensor according to an embodiment of the disclosure, FIG. 2 is a schematic structural view of another perspective view of a piezoelectric acceleration sensor according to an embodiment of the disclosure, FIG. 3 is a top plan view of a piezoelectric acceleration sensor according to an embodiment of the disclosure, FIG. 4 is a cross-sectional view taken along line A-A of FIG. 3, and FIG. 5 is a cross-sectional view taken along line B-B of FIG. 3. The piezoelectric acceleration sensor according to this embodiment includes at least a charge output element 1, a casing 2, a cable assembly 3, and a connector 4.

The charge output element 1 includes a base 11, a piezoelectric element 12, and a mass block 13. The base 11 includes a supporting portion 111 and a connecting portion 112 disposed on the supporting portion 111 and extending in a first direction. The piezoelectric element 12 and the mass block 13 are arranged along the first direction and respectively sleeved on the connecting portion 112. The piezoelectric element 12 is disposed close to the supporting portion 111 with respect to the mass block 13. The first direction in this embodiment may be X direction shown in FIG. 4.

The casing 2 is snap-fitted to the supporting portion 111 of the base 11 and forms a receiving space together with the supporting portion 111. The connecting portion 112, the piezoelectric element 12, and the mass block 13 are disposed within the receiving space.

The cable assembly 3 is connected to the supporting portion 111. The cable assembly 3 extends in a second direction. The cable assembly 3 includes a cable body 31. The cable body 31 includes a protective case, and first and second leads penetrating the protective case. One end of each of the first lead and the second lead passes through the supporting portion 111 into the receiving space and is electrically connected to the piezoelectric element 12. It can be appreciated that the first lead and the second lead are respectively connected to the two polarized electrodes of the piezoelectric element 12.

The connector 4 is connected to one end of the cable assembly 3 facing away from the supporting portion 111 and is insulated from the cable assembly 3. The connector 4 includes a housing 41 that is open at both ends, a first insulating layer 42 that is disposed inside the housing 41, and a conductive terminal 43 that is disposed inside the first insulating layer 42 and penetrates the first insulating layer 42 in the direction of the two openings of the housing 41. The other end of the first lead is electrically connected to the conductive terminal 43 of the connector 4, and the other end of the second lead is electrically connected to the housing 41 of the connector 4.

In the embodiment of the disclosure, since one of the two electrodes of the piezoelectric element 12 is connected to the conductive terminal 43 of the connector 4, the output of the electrical signal of the charge output element 1 is achieved. Further, since the other of the two electrodes of the piezoelectric element 12 is connected to the housing 41 of the connector 4 and the housing 41 of the connector 4 is insulated from the casing 2 of the piezoelectric acceleration sensor, the grounding of the charge output element 1 is realized by the housing 41 of the connector 4. Therefore, it is possible to ensure isolation between the output of signal from the piezoelectric acceleration sensor and the casing 2 of the piezoelectric acceleration sensor when the piezoelectric acceleration sensor according to the embodiment is applied to the object to be measured, thereby avoiding the influence of the casing 2 on the output signal of the charge output element 1, ensuring the measurement accuracy of the piezoelectric acceleration sensor, and effectively solving the problem that the piezoelectric acceleration sensor of the single-core output is susceptible to external noise.

In this embodiment, the first direction may form preset angles with respect to the second direction, for example the first direction and the second direction may intersect with each other or may be parallel to each other.

In this embodiment, the piezoelectric element 12 includes piezoelectric sheets which are laminated on each other. The piezoelectric sheet may be Lead Zirconate Titanate piezoelectric ceramic sheet (PZT piezoelectric ceramic sheet). Since the piezoelectric coefficient of the PZT piezoelectric ceramic sheet changes little as the temperature increases, the temperature drift of the piezoelectric acceleration sensor is small. On adjacent end faces of the piezoelectric sheets that are laminated on each other, the electrode sheets are provided. The electrode sheet may be nickel-based alloy electrode sheet. The adjacent end faces of the two adjacent piezoelectric sheets have the same polarity. By electrically connecting the piezoelectric sheets having the same polarity to the first lead and the second lead, respectively, the electrical signal output and grounding of the piezoelectric element 12 are realized.

The piezoelectric sheet may have an annular sheet-like structure. The inner annular surface of the annular sheet-like structure is circular, while the outer annular surface thereof is rectangular.

On two end faces of each of the piezoelectric sheets laminated in the first direction, insulating sheets may be provided. The insulating sheet may be an alumina ceramic sheet, such that the piezoelectric element 12 is insulated from the base 11 and the mass block 13.

The charge output element 1 may further include a fastening member 14 that is sleeved on the supporting portion 111 and located on a side of the mass block 13 facing away from the piezoelectric element 12. One end of the connecting portion 112 facing away from the supporting portion 111 may be provided with an external thread having a predetermined length. The fastening member 14 may be a nut. By engagement of the nut with the external thread on the connecting portion 112, the pre-tightening among the mass block 13, the piezoelectric element 12, and the supporting portion 111 is achieved.

In some alternative embodiments, the supporting portion 111 is provided with a mounting hole 1111 penetrating the supporting portion 111 in a direction perpendicular to an axial direction of the connecting portion 112. In other words, the mounting hole 1111 extends in the Y direction shown in FIG. 4, and the extending direction of the mounting hole 1111 is perpendicular to the extending direction of the connecting portion 112. The piezoelectric acceleration sensor according to this embodiment can be fixed to the object to be measured through the mounting hole 1111.

In this embodiment, the supporting portion 111 may have a cubic or cylindrical structure, which facilitates processing. The supporting portion 111 and the connecting portion 112 may be integrally formed to enhance the overall rigidity. The material of the fastening member 14, the supporting portion 111 and the connecting portion 112 may be all a cobalt-based alloy, such as L605. It can be appreciated that the supporting portion 111 is provided with two through holes through which the two leads of the cable assembly 3 pass respectively. By inserting the two leads into the two through holes respectively, the first lead and the second lead can be protected, while the first lead and the second lead can be isolated from each other, thereby preventing signal interference between the first lead and the second lead.

In some alternative embodiments, the casing 2 includes a surface parallel to the axial direction of the connecting portion 112, an extension portion 21 is formed by extending the surface parallel to the connecting portion 112 in a direction away from the supporting portion 111. A mounting portion 211 is provided on the extension portion 21, and the mounting portion 211 in this embodiment is a recess structure formed by recessing the edge of the extension portion 21 toward the interior of the extension portion 21. Further, the recess structure may be a semi-circular recess. By providing a screw at the recess structure, the fixing of the piezoelectric acceleration sensor can be further achieved. In this embodiment, the extension portion 21 is integrally formed with the casing 2.

In some alternative embodiments, the end of the conductive terminal 43 of the connector 4 close to the cable assembly 3 is provided with a first through hole 431 penetrating in a direction perpendicular to an axial direction of the conductive terminal 43. The first lead passes through the first through hole 431 and is electrically connected to the conductive terminal 43. Alternatively, in order to ensure the stability of the connection between the first lead and the conductive terminal 43, the first lead may be fixed by welding after passing through the first through hole 431.

In some alternative embodiments, the end of the conductive terminal 43 away from the cable assembly 3 is provided with a first recess 432 formed by recessing for a first predetermined length along the axial direction of the conductive terminal 43. With the first recess 432, the insertion of the connector 4 with the terminal of its mating connector is achieved. It can be appreciated that the mating connector includes a bump structure that matches the first recess 423.

In this embodiment, the shape of the first recess 432 is not limited. For example, the cross section of the first recess 432 perpendicular to the axial direction may be circular or rectangular. The ratio of the predetermined length of the first recess 432 to the axial length of the conductive terminal 43 may be ⅓ to ½. Therefore, the stability of the connection can be ensured, and the overall strength of the conductive terminal 43 can be ensured.

In this embodiment, the recess wall of the first recess 432 may be provided with two opposite openings 433. Each of the openings 433 is formed by recessing a notch of the first recess 432 toward the interior of the first recess 432. As such, when the terminal of the mating connector of the connector 4 according to this embodiment is inserted into the first recess 432, it can be further fixed by the two opposite openings 433, thereby ensuring the stability of the connection between the connector 4 and its mating connector, and improving accuracy of signal transmission.

In other alternative embodiments, the side wall of the housing 41 is provided with at least one second through hole 411 penetrating the side wall, and the second lead is electrically connected to the housing 41 of the connector 4 through one of the second through holes 411. Alternatively, in order to ensure the stability of the connection between the second lead and the conductive terminal 43, the second lead may be fixed by welding after passing through the second through hole 411.

In some alternative embodiments, the first insulating layer 42 includes a first glass layer 421 and a ceramic layer 422 which are sequentially disposed along the axial direction of the conductive terminal 43, wherein the first glass layer 421 is disposed close to the cable assembly 3 with respect to the ceramic layer 422. The first glass layer 421 is formed between the housing 41 of the connector 4 and the conductive terminal 43 by a glass sintering process. With the first glass layer 421, the insulation between the conductive terminal 43 and the housing 41 is achieved. Further, the housing 41 of the connector 4, the conductive terminal 43 and the ceramic layer 422 can be bonded by the first glass layer 421, and therefore, the insulation effect can be still ensured even if the piezoelectric acceleration sensor according to this embodiment is used in a high temperature environment exceeding 659 degrees.

In some alternative embodiments, the cable assembly 3 further includes a first sleeve 32 through which the cable body 31 is connected to the connector 4. One end of the first sleeve 32 is connected to the end of the cable body 31 away from the supporting portion 111. For example, the first sleeve 32 may be connected to the protective case of the cable body 31 by welding. The other end of the first sleeve 32 is connected to the connector 4 through the second insulating layer 5. The housing 41 of the connector 4 partially protrudes into the first sleeve 32, and the second insulating layer 5 is sleeved on the outer peripheral surface of the connector 4.

In this embodiment, the second insulating layer 5 may be a second glass layer. Specifically, the first sleeve 32 may be connected to the housing 41 of the connector 4 by a glass sintering process, and therefore, the insulation between the first sleeve 32 and the housing 41 of the connector 4 may be achieved. With the second glass layer, the insulation between the cable assembly 3 and the connector 4 is achieved, and the insulation effect and the connection effect can be still ensured even if the piezoelectric acceleration sensor according to this embodiment is used in a high temperature environment exceeding 659 degrees.

Alternatively, a convex portion 412 is provided on the outer peripheral surface between the axial ends of the housing 41. The convex portion 412 is provided with a locking wire hole 4121. When the connector 4 according to this embodiment is connected to the mating connector, the provision of the locking wire hole 4121 facilitates further fixing of the two connectors by passing the lock wire through the locking wire hole in the connector 4 according to this embodiment and the locking wire hole in the mating connector.

Alternatively, the connector 4 may be disposed coaxially with the first sleeve 32 to ensure the rigidity of the connection, thereby further ensuring the accuracy of signal transmission. The extending direction of the cable assembly 3 is opposite to and parallel to the extending direction of the connecting portion 112, that is, the cable assembly 3 and the connecting portion 112 extend in opposite directions. Thus, since the mounting hole 1111 is disposed between the cable assembly 3 and the connecting portion 112, it is possible to ensure that the quality at mounting position on both sides of the piezoelectric acceleration sensor is relatively balanced, which is beneficial to the overall stability.

In some alternative embodiments, the cable assembly 3 further includes a second sleeve 33 by which the cable body 31 is connected to the casing 2. One end of the second sleeve 33 is welded to the supporting portion 111 of the base 11 and the other end thereof is connected to the cable body 31, so as to ensure the stability of mounting of the cable body 31.

The disclosure may be embodied in other specific forms without departing from the spirit and essential characteristics of the disclosure. For example, the algorithms described in the specific embodiments may be modified, and the system architecture does not depart from the basic spirit of the disclosure. Therefore, the above mentioned embodiments are to be considered in all respects as illustrative rather than restrictive. The scope of the disclosure is defined by the appended claims rather than the foregoing description, and all modifications within the scope of the claims and the equivalents thereof are intended to be included within the scope of the disclosure.

What is claimed is:

1. A piezoelectric acceleration sensor, comprising:
a charge output element comprising a base, a piezoelectric element and a mass block, wherein the base comprises a supporting portion and a connecting portion disposed on the supporting portion and extending in a first direction, the piezoelectric element and the mass block are arranged along the first direction and sleeved respectively on the connecting portion, and the piezoelectric element is disposed close to the supporting portion with respect to the mass block;
a casing snap-fitted to the supporting portion, wherein the casing forms a receiving space together with the supporting portion, the connecting portion, the piezoelectric element and the mass block are disposed within the receiving space;
a cable assembly connected to the supporting portion, wherein the cable assembly extends in a second direction, the cable assembly comprises a cable body, the cable body comprises a protective case and first and second leads penetrating the protective case, and one end of each of the first lead and the second lead passes through the supporting portion into the receiving space and is electrically connected to the piezoelectric element; and
a connector connected to an end of the cable assembly facing away from the supporting portion and insulated from the cable assembly, wherein the connector comprises an housing that is open at both ends, a first insulating layer disposed in the housing, and a conductive terminal penetrating the first insulating layer along a direction of the two openings of the housing, the other end of the first lead is electrically connected to the conductive terminal, and the other end of the second lead is electrically connected to the housing.

2. The piezoelectric acceleration sensor according to claim 1, wherein an end of the conductive terminal close to the cable assembly is provided with a first through hole penetrating in a direction perpendicular to an axial direction of the conductive terminal, and the first lead is electrically connected to the conductive terminal through the first through hole.

3. The piezoelectric acceleration sensor according to claim 1, wherein an end of the conductive terminal away from the cable assembly is provided with a first recess which is formed by recessing for a first predetermined length in an axial direction of the conductive terminal.

4. The piezoelectric acceleration sensor according to claim 3, wherein a recess wall of the first recess is provided with two openings which are disposed oppositely and formed by recessing from a notch of the first recess toward an interior of the first recess.

5. The piezoelectric acceleration sensor according to claim 1, wherein a side wall of the housing is provided with at least one second through hole penetrating the side wall, and the second lead wire is electrically connected to the housing through one of the second through holes.

6. The piezoelectric acceleration sensor according to claim 1, wherein the first insulating layer comprises a first glass layer and a ceramic layer which are sequentially disposed along an axial direction of the conductive terminal, and the glass layer is disposed close to the cable assembly with respect to the ceramic layer.

7. The piezoelectric acceleration sensor according to claim 1, wherein the cable assembly further comprises a first sleeve, one end of the first sleeve is connected to an end of the cable body away from the supporting portion while the other end of the first sleeve is connected to the connector through a second insulating layer, the housing partially extends into the first sleeve, and the second insulating layer is sleeved on an outer peripheral surface of the connector.

8. The piezoelectric acceleration sensor according to claim 7, wherein a convex portion is provided on an outer peripheral surface between two axial ends of the housing, the convex portion is provided with a locking wire hole, and the second insulating layer is a second glass layer.

9. The piezoelectric acceleration sensor according to claim 7, wherein the connector is disposed coaxially with the first sleeve, and an extending direction of the cable assembly is opposite to and parallel to an extending direction of the connecting portion.

10. The piezoelectric acceleration sensor according to claim 8, wherein the connector is disposed coaxially with the first sleeve, and an extending direction of the cable assembly is opposite to and parallel to an extending direction of the connecting portion.

11. The piezoelectric acceleration sensor according to claim 1, wherein the cable assembly further comprises a second sleeve, and the cable body is connected to the casing by the second sleeve.

12. The piezoelectric acceleration sensor according to claim 1, wherein the supporting portion is provided with a mounting hole penetrating the supporting portion in a direction perpendicular to an axial direction of the connecting portion.

13. The piezoelectric acceleration sensor according to claim 1, wherein the casing comprises a surface parallel to an axial direction of the connecting portion, an extension portion is formed by extending the surface in a direction away from the supporting portion, a mounting portion is provided on the extension portion, and the mounting portion is a recess structure formed by recessing an edge of the extension portion toward an interior of the extension portion.

* * * * *